Figure 1:
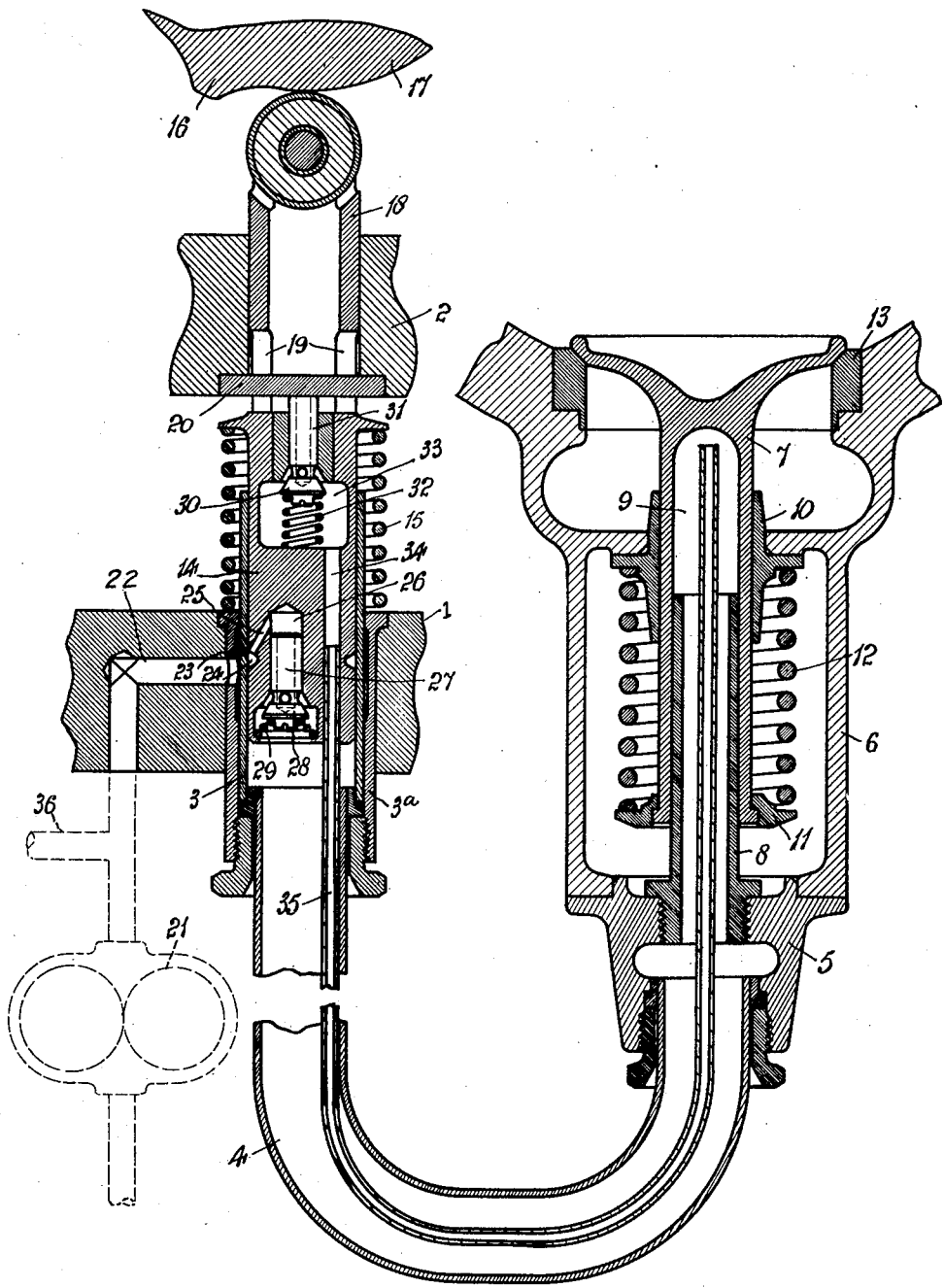

Dec. 8, 1936.  W. NOBLE  2,063,881

HYDRAULIC VALVE GEAR

Original Filed April 28, 1923

INVENTOR
Warren Noble.
BY
Stanley Lightfoot.
ATTORNEY

Patented Dec. 8, 1936

2,063,881

UNITED STATES PATENT OFFICE 2,063,881

HYDRAULIC VALVE GEAR

Warren Noble, Michigan City, Ind., assignor to General Motors Corporation, Detroit, Mich., a corporation of Delaware Refiled for abandoned application Serial No. 273,592, April 28, 1928. This application March 13, 1935, Serial No. 10,893

11 Claims. (Cl. 123—90)

This invention relates to hydraulic valve gears wherein a plunger operating in an actuating cylinder effects the lifting of the puppet valve of an engine, or other device, from its seat through the agency of a column of oil contained in a hydraulic fluid casing, and is refiled for the abandoned application Serial No. 273,592, filed April 28, 1928.

In such systems, it is desirable that air be eliminated from the hydraulic fluid column for most satisfactory operation, as such air, being compressible, affects the proper translation of the plunger motion into motion of the puppet valve. According to the relative disposition of the parts such air may accumulate in a high point in the system adjacent to the plunger or remote therefrom; and it is the object of this invention to provide certain means for effecting and facilitating the disposition of such accumulated air in order to avoid the disadvantages which would accrue if such air were not disposed of.

The invention further contemplates the provision of means whereby such air may be bled from any point of air accumulation system in any automatic manner, whereby the relief of such air from the system will be effected at a time when the opening of such systems for such relief will not materially affect the proper operation of the puppet valve.

Still further, it is the object of the invention to provide means in the plunger operable to control relief flow from a point of air accumulation in the system, whereby such relief will be effected when the plunger is in other than a puppet valve lifting position and when the column of hydraulic fluid will not be subjected to the pressures incidental to the puppet valve being lifted from its seat.

A further object of the invention is to provide valvular air bleed means in the plunger together with means effecting the opening of such air bleed means when the plunger is substantially at rest, and in an inoperative position, whereby air may be bled from such said system through said plunger during such rest periods.

Still further objects or advantages subsidiary or incidental to, or resulting from the aforesaid objects, or from the construction or operation of the invention as it may be carried into effect, will become apparent as the invention is hereinafter further disclosed.

In carrying the said invention into effect, I may provide a hydraulic valve gear having a cam-operated plunger, a cylinder in which said plunger works, a puppet valve, a closed hydraulic fluid casing connecting such cylinder with said puppet valve in such manner that movement of hydraulic fluid in said casing by said plunger will effect movement of said puppet valve, valvular means admitting hydraulic valve fluid under pressure to said casing when said plunger is at rest, such as when its follower rides the base circle of the operating cam, a relief valve in said plunger opened by a stop when said plunger is so at rest, and means establishing communication between said relief valve and a high point of air accumulation in the hydraulic valve gear system. All of which is more particularly described and ascertained hereinafter, by way of example, having reference to the accompanying drawing, wherein:

Figure 1 is a sectional, more or less diagrammatic, view of a hydraulic valve gear system according to said invention.

1 and 2 are members which may be part of the crankcase of an engine, the member 1 carrying a sleeve 3ª in which is firmly fitted a cylinder 3. The outer end of this cylinder has secured thereto a tube 4 which leads to a fitting 5 carried by the spring housing 6 of a puppet valve 7, this fitting having mounted thereon a tubular extension 8 which enters the hollow stem 9 of the said puppet valve, which stem is slidable over the said tubular extension 8 and is further guided by a bushing 10 on the inner end of the spring housing. 11 is a washer on the outer end of the valve stem 9 between which washer and the shoulder of the said bushing 10 a puppet valve spring 12 is located to normally maintain the puppet valve closed upon its seat 13.

Slidably in the cylinder 3 is a plunger 14 yieldingly held against movement inwardly of the cylinder by a plunger spring 15, and this plunger is adapted to be moved into the said cylinder, by the lobe 16, of a cam 17, through the medium of the cam follower 18. The cam follower has its walls slotted at 19 to provide clearance for a transverse bar or stop 20 carried by the member 2.

The chamber of the cylinder 3, the tube 4, extension 8, and the hollow valve stem 9 form a hydraulic fluid casing inclosing the hydraulic fluid through which the puppet valve is operated, and 21 is a hydraulic fluid supply pump maintaining a pressure supply in a feed duct 22 which opens to a port 23 in the wall of the cylinder 3. The plunger 14 is provided with a passage 24 adapted to coincide with the said port 23 when the plunger is at rest and is not actuated by the lobe 16 of the cam as shown in the drawing. The said passage 24 communicates, through a passage 25, with a chamber 26 in the plunger, in which chamber the hollow stem 27 of a fluid supply valve 28 works so that passage of fluid under pressure from the duct 22 to the chamber 26 will effect the lifting of the fluid supply valve 28 from its seat against the resistance of a valve spring 29 when the plunger is in its said position of rest.

In the base of the plunger is a relief valve 30 having a hollow stem 31 and adapted to be lifted from its seat by contact of the said stop 20 when the said plunger is in its rest position, as shown, this lifting being effected against the resistance of the valve spring 32. The valve 30 is an outlet valve opening from a chamber 33 in the said plunger, and 34 is a longitudinal passage in the plunger extending to the inner end thereof and slidably receiving one end of a tube 35, which tube, in the illustrated example, extends entirely through the actuator tube 4, its other end being located in the hollow stem 9 of the puppet valve 7 close to the inner end of the bore of the said stem.

With the parts arranged as illustrated, the inner end of the bore of the stem forms a high point in which air may accumulate in the system and the tube 35, therefore, establishes communication between this point of air accumulation and the outlet or relief valve 30.

It will be observed that the chamber of the cylinder directly beneath the inner end of the plunger may possibly form a point of air accumulation, and the end of the tube 35 entering a passage 34 of the plunger may, therefore, have sufficient clearance to permit a certain amount of flow sufficient for the passage of air between the wall of the said tube 35 and the wall of the opening 34.

It will be apparent from an examination of the drawing, that flow of a hydraulic fluid through the plunger and past the valve 28 into the system will induce a flow through the tube 35 from the inner end of the bore of the stem of the puppet valve and out of the plunger past the open relief valve 30, such flow carrying with it any air which may have accumulated in the valve stem; and similarly, where flow is permitted between the wall of the passage 34 and that part of the wall 35 which enters the said passage, such flow will also carry to the relief valve air which may have accumulated beneath the plunger.

It will be understood that the clearance between the tube and the wall passage 34 is not such that would permit sufficiently free flow to prevent flow taking place from valve stem through the tube 35; and it is further preferred that the bore of the tube 35 be sufficiently small as to be of a more or less capillary nature whereby entraining of air to the relief valve may be effected without the tendency of such air to flow back through the tube into the valve stem.

36 indicates a branch from the oil feed duct which may extend to a suitable relief valve (not shown) for the determining of the required pressure in the said duct.

When the plunger is actuated by the lobe 16 of the cam, the relief valve stem 31 is disengaged from the stop 20 and the relief valve consequently seated by its spring, and also the inlet port 23 is closed as the plunger moves inwardly of the cylinder so that the hydraulic system becomes entirely closed during puppet valve operation as is desired.

If thought necessary, the flow through the bleed pipe 35 may be sufficiently voluminous to permit an amount of oil to pass through the system, when the plunger is at rest, sufficient to materially cool the stem of the said puppet valve. It is to be understood that this is a secondary object of the bleed pipe 35 to that of the air elimination which it is primarily designed to effect.

This invention may be developed within the scope of the following claims departing from the essential features of the said invention, and it is desired that the specification and drawing be read as being more illustrative and not in a limited sense except that as necessitated by the prior art.

I claim:

1. In a hydraulic valve gear, in combination with a hydraulic fluid casing, valve actuating mechanism including a plunger intermittently operable to exert pressure on fluid in said casing, a cylinder inclosing said plunger, said cylinder having a non-return pressure fluid supply thereto, a relief valve in said plunger opening from a region of air accumulation in said casing, and valve unseating means exterior of said plunger, said means unseating said relief valve when said plunger is in its normal inoperative position.

2. In a hydraulic valve gear, in combination with a hydraulic fluid casing, valve actuating mechanism including a plunger intermittently operable to exert pressure on fluid in said casing, a cylinder inclosing said plunger, said cylinder having a pressure fluid supply thereto controlled by said plunger whereby said supply is admitted to said cylinder when said plunger is in a normal inoperative position, a relief valve in said plunger opening from a region of air accumulation in said casing, and valve unseating means exterior of said plunger, said means unseating said relief valve when said plunger is in its normal inoperative position.

3. In a hydraulic valve gear, in combination with a hydraulic fluid casing, valve actuating mechanism including a plunger intermittently operating to exert pressure on fluid in said casing, a cylinder inclosing said plunger, said cylinder having a non-return pressure fluid supply thereto, a relief valve in said plunger, means for opening said relief valve when said plunger is in its normal inoperative position, and a walled passage leading from a point of air accumulation in said casing, through said plunger, to said relief valve.

4. In a hydraulic valve gear, in combination, an actuator cylinder, an actuator plunger in said cylinder, a puppet valve having a hollow stem, a tubular member relative to which the hollow stem of said puppet valve is slidable, a tubular connection between said cylinder and said tubular member, and means operating said plunger in its cylinder to effect through a body of hydraulic fluid in said cylinder, said tubular connection, said member, and said hollow valve stem, the actuation of said puppet valve.

5. In a hydraulic valve gear, the combination according to claim 4, including a non-return pressure fluid supply line to said gear, a fluid relief valve from said gear, means establishing communication between said relief valve and a point of air accumulation in said gear, and means determining the opening of said relief valve when said plunger is in a position wherein said puppet valve is seated.

6. In a hydraulic valve gear, the combination according to claim 4, including a non-return pressure fluid supply line to said gear, a fluid relief valve in said plunger, means establishing communication between said relief valve and a point of air accumulation in said gear, and means determining the opening of said relief valve when said plunger is in a position wherein said puppet valve is seated.

7. In a hydraulic valve gear, a hydraulic fluid casing, an actuator comprising a plunger operating against fluid in the casing, a puppet valve having its stem exposed to the fluid whereby a change in pressure may operate the valve, a pair of fluid control valves in the plunger, a walled fluid supply passage leading to one of the last-mentioned valves, a walled fluid passage leading from a point of air accumulation of the fluid system to the second of these valves, means to operate one of said control valves to control the supply of fluid to the system and means to operate the other of said control valves to bleed air from the system.

8. In hydraulic valve gear, a hydraulic casing, a plunger therein, a plurality of spring biased valves in the plunger, a source of fluid pressure supply, a channel in the plunger to one valve from the supply, a second channel through the plunger to the second valve from a point of air accumulation to bleed fluid and air from the casing, and outside operating means for the second valve to actuate the same.

9. In hydraulic valve gear, a fluid casing, a plunger operable within the casing, a puppet valve having a hollow stem relatively movable at one end of the fluid casing, a supply and a relief valve in the plunger alternately operable, and a tubular air bleed connecting the top of the hollow portion of the valve stem with the relief valve to remove the accumulated air therefrom.

10. In hydraulic valve gear, a hydraulic casing, a plunger therein, a plurality of separate valves therein independently spring biased to closed position, means supplying pressure for opening one of said valves and means to open the other of said valves.

11. In a device of the class described, in combination with a closed hydraulic fluid casing, an actuator cylinder, a plunger in said actuator cylinder, an air bleed valve in said plunger, control means for the air bleed valve, and means in the plunger supplying fluid under pressure to said casing, said supply means being sensitive to differential pressure between said fluid supply and fluid in the casing.

WARREN NOBLE.